US012606389B2

(12) United States Patent
Fagan et al.

(10) Patent No.: US 12,606,389 B2
(45) Date of Patent: Apr. 21, 2026

(54) VISION-BASED DETECTION AND CONTROL OF MACHINERY

(71) Applicant: Roadtec, Inc., Chattanooga, TN (US)

(72) Inventors: Thomas Fagan, Chattanooga, TN (US); Ramon Pujol, Chattanooga, TN (US); Todd Avans, Soddy Daisy, TN (US)

(73) Assignee: Roadtec, Inc., Chattanooga, TN (US)

( * ) Notice: Subject to any disclaimer, the term of this patent is extended or adjusted under 35 U.S.C. 154(b) by 104 days.

(21) Appl. No.: 18/821,381

(22) Filed: Aug. 30, 2024

(65) Prior Publication Data

US 2025/0074723 A1 Mar. 6, 2025

Related U.S. Application Data

(60) Provisional application No. 63/580,095, filed on Sep. 1, 2023, provisional application No. 63/580,090, filed on Sep. 1, 2023.

(51) Int. Cl.

| | |
|---|---|
| *B65G 65/00* | (2006.01) |
| *B65G 43/00* | (2006.01) |
| *B65G 67/08* | (2006.01) |
| *G06V 10/70* | (2022.01) |
| *G06V 10/82* | (2022.01) |

(Continued)

(52) U.S. Cl.
CPC ........... *B65G 65/005* (2013.01); *B65G 43/00* (2013.01); *B65G 67/08* (2013.01); *G06V 10/70* (2022.01); *G06V 10/82* (2022.01); *G06V 20/56* (2022.01); *B65G 2203/041* (2013.01); *E01C 23/08* (2013.01); *E01C 2301/00* (2013.01); *E01C 2301/04* (2013.01)

(58) Field of Classification Search
None
See application file for complete search history.

(56) References Cited

U.S. PATENT DOCUMENTS

| | | | |
|---|---|---|---|
| 2022/0022375 A1* | 1/2022 | Murray | A01D 41/127 |
| 2022/0258966 A1 | 8/2022 | Maroney et al. | |
| 2023/0010394 A1* | 1/2023 | Häberle | G06V 10/82 |

OTHER PUBLICATIONS

Azar, Ehsan Rezazadeh, et al., Earthmoving Equipment Automation: A Review of Technical Advances and Future Outlook, ITcon vol. 22, 2017, pp. 247-265.

(Continued)

*Primary Examiner* — Peter D Nolan
*Assistant Examiner* — Michael F Whalen
(74) *Attorney, Agent, or Firm* — Chambliss, Bahner & Stophel, P.C.; Stephen D. Adams

(57) ABSTRACT

A system for modifying an operational condition, i.e., the discharge speed or position, of a material-handling vehicle (MHV). The system includes a computer utilizing a machine learning engine to analyze visual data, a vision system comprising at least one camera mounted to the MHV for generating said visual data, and a controller operatively connected to the MHV. The vision system generates visual data by imaging an observed area proximate the MHV. That data is transmitted to the computer which, using a processor, analyzes the data to determine if a current operational condition of the MHV is outside of a tolerance band. If it is outside of the band, the computer system generates operational commands to bring the MHV back within the tolerance band and transmits said commands to the controller.

20 Claims, 8 Drawing Sheets

(51) Int. Cl.
    *G06V 20/56*     (2022.01)
    *E01C 23/08*     (2006.01)

(56)         References Cited

OTHER PUBLICATIONS

Borngrund, Carl, et al., Deep-learning-based vision for earth-moving automation. Automation in Construction, vol. 133, Jan. 2022, 104013.
Examination report for Australian patent application No. 2024216536, dated Jul. 30, 2025, 7 pages/.

\* cited by examiner

VISION-BASED DETECTION AND CONTROL OF MACHINERY

CROSS-REFERENCE TO RELATED APPLICATIONS

This application claims the benefit of U.S. Provisional Application No. 63/580,090 filed Sep. 1, 2023, and titled "CONVEYOR AUTOMATION," and U.S. Provisional Application No. 63/580,095 filed Sep. 1, 2023, and titled "DISCRETE HUMAN/OBJECT DETECTION," the content of each is incorporated herein by reference in its entirety.

FIELD

This invention relates generally to detecting objects or entities of interest located near or around road-building or other equipment. More specifically, the invention relates to a system for detecting objects or entities of interest and generating commands to modify an operational condition of road-building equipment based on conditions of the area surrounding the road-building equipment.

BACKGROUND

In many industries, and particularly in the road-construction industry, maintaining site safety and machine efficiency are both intertwined and of paramount importance. For example, at a typical road-building site, several types of material-handling vehicles (MHVs) and machinery are constantly in operation and are in motion around the site. The same is true for laborers performing tasks that are related or are unrelated to the machinery. These laborers, in conjunction with the machine operators located on the various MHVs and machinery, often work together to keep the machines running and performing their desired functions. In certain instances, a laborer may walk alongside an MHV and relay information to the machine operator. The machine operator, in response, may change the speed, direction, or engage/disengage certain functions of the MHV.

Referring to FIG. 1, one common example of a conventional vehicle "train" 10 used for carrying out a paving operation and comprised of a dump truck 12, a material transfer vehicle (MTV) 14, and a paving machine 16 is shown. As the paving operation commences, the train 10 moves in direction D, leaving, in its path, fresh asphalt. The dump truck 12 supplies paving material 18 to an intake hopper 20 of the MTV 14. The MTV 14 then holds the paving material 18 and discharges it as necessary via a discharge conveyor 22. In use, the discharge conveyor 22 is preferably aligned with the paver hopper 24 of the paving machine 16 so the discharge from the discharge conveyor 22 falls in the paver hopper 24. However, there are many factors that can adversely impact the transfer of material from the discharge conveyor 22 to the paver hopper 24. For example, the discharge conveyor 22 could be misaligned, including a front-to-back misalignment and/or a side-to-side misalignment. The discharge conveyor 20 may also be too high or low in elevation in relation to the elevation of the paver hopper 24. This may be the result of the MTV 14 or paving machine 16 moving at an incorrect speed, a change in the grade of the road surface, or a turn in the road. Similarly, the material discharged from the discharge conveyor 22 might be discharged too quickly and overfill the paver hopper 24.

In other cases, the opposite might be true as the paver hopper 24 is filled too slowly to maintain paving operations at a desired continuous pace.

Conventionally, laborers or operators were required to be located near the discharge area for various reasons, including to relay necessary positional or operational information or instructions to the operator of the MTV 14 or the paving machine 16. However, in recent years, camera systems have been added to the various MHVs and the video stream is sent to a machine operator. The use of such camera systems has allowed operators to remotely view the discharge area or other critical areas and make any necessary adjustments without being physically located near them. Thus, advantageously, such camera systems can allow the laborer to be removed from the potentially dangerous position near MHVs. However, in many cases, this type of camera-based monitoring requires highly skilled machine operators that are capable of operating the machine in a safe and efficient manner while simultaneously observing the video stream and making required adjustments to the machine path, speed, or function. Thus, the use of such camera systems adds yet another task for operators to undertake.

In addition to controlling and maintaining the MHV path, speed and function, machine operators may also be required to monitor and react to unexpected objects or people entering and moving about the work site. While, ideally, a worksite is secure and unauthorized individuals are not permitted, this is not always the case. In certain instances, unauthorized individuals or objects might be purposefully or accidentally located at a road construction site. For example, an unattended child might inadvertently or unknowingly wander into the path of a paving machine. While the machine operator is, ideally, alert and is able to see the child and react appropriately, this might not always be possible, especially when large or complicated machines are in use, during very busy times, and/or in areas that are congested or have reduced visibility. In another example, unauthorized individuals might be located on the worksite. While workers can sometimes be identified based on their personal protective equipment (PPE), this identification process can be distracting because it requires a machine operator to take their focus off of the task at hand, to make visual contact with the person, and to then try to identify that person based on their PPE. In a third example, personnel on a worksite might be required to also identify foreign objects that are present. These types of objects present a unique problem as they may be intermixed with other, important objects. For example, while a road-construction site might be provided with strategically placed safety cones and barrels, debris (e.g., tire treads, etc.) from the roadway might also be present. A machine operator or laborer must be diligent to observe and react appropriately to the various objects around the road-building site. While camera systems and scanners have been used in in the past in attempts to remedy these problems, these systems and methods can be distracting. Requiring an operator to monitor the images captured by such systems adds another task for those operators to undertake. In such cases, the machine operator must act quickly and appropriately to the person or object entering into the visible or scanned area but may be too busy doing other things to do so consistently. Further, in the case of unauthorized personnel, the machine operator must be able to identify who and who is not authorized or permitted on the worksite.

What is needed, therefore, is a system for monitoring an area nearby or adjacent a MHV and for automatically controlling the MHV in response to changes in the area.

3
NOTES ON CONSTRUCTION

The use of the terms "a", "an", "the" and similar terms in the context of describing the invention are to be construed to cover both the singular and the plural, unless otherwise indicated herein or clearly contradicted by context. The terms "comprising", "having", "including" and "containing" are to be construed as open-ended terms (i.e., meaning "including, but not limited to,") unless otherwise noted. The terms "substantially", "generally" and other words of degree are relative modifiers intended to indicate permissible variation from the characteristic so modified. The use of such terms in describing a physical or functional characteristic of the invention is not intended to limit such characteristic to the absolute value which the term modifies, but rather to provide an approximation of the value of such physical or functional characteristic.

Terms concerning attachments, coupling and the like, such as "connected" and "interconnected", refer to a relationship wherein structures are secured or attached to one another either directly or indirectly through intervening structures, as well as both moveable and rigid attachments or relationships, unless specified herein or clearly indicated by context. The term "operatively connected" is such an attachment, coupling or connection that allows the pertinent structures to operate as intended by virtue of that relationship.

The use of any and all examples or exemplary language (e.g., "such as" and "preferably") herein is intended merely to better illuminate the invention and the preferred embodiment thereof, and not to place a limitation on the scope of the invention. Nothing in the specification should be construed as indicating any element as essential to the practice of the invention unless so stated with specificity.

As used herein, the phrase "material-handling vehicle" and the term "MHV" each mean a machine designed to convey, transfer, or manipulate various materials. The materials are used at a road-building site, during the road-construction process, or during an earlier operation required for road-construction, such as quarrying. Examples of MHVs include, but are not limited to, dump trucks, material transfer vehicles, paving machines, steam rollers, stacking conveyors, milling machines, and other similar machines.

As used herein, the phrase "standard camera" means an instrument used to capture images and videos visible to the human eye without advanced processing. This includes but is not limited to mirrorless cameras, action cameras, digital video cameras, wired cameras, wireless cameras, internet protocol cameras, power over Ethernet cameras, analog cameras, closed-circuit television cameras, pan-tilt-zoom cameras, and other similar cameras.

SUMMARY

The above and other problems are addressed by a system for altering an operational condition of a material-handling vehicle (MHV), as disclosed herein. The system may comprise a computer system, a vision system, and a controller. The computer system may have a processor configured to analyze visual data using a machine learning (ML) engine. The vision system comprises at least one camera that is configured to mount to the MHV, to generate visual data by imaging an observed area proximate the MHV, and to transmit the visual data to the computer system for analysis. In certain embodiments, the vision system may comprise at least one of a standard camera, stereoscopic camera, infrared camera, LiDAR, or time of flight sensor. The controller may be operatively connected to the MHV and may be configured to receive an operational set point for the MHV and to execute operational commands generated by the processor. The commands may modify an operational condition of the MHV when executed by the controller. In certain embodiments, the computer system is configured to receive the visual data transmitted from the vision system. The computer system is further configured to analyze the visual data using the ML engine to determine if a current operational condition of the MHV is within a tolerance band of the operational set point. When the current operational condition of the MHV is outside of the tolerance band of the operational set point, the computer system is configured to generate operational commands for modifying the operational condition that are calculated to bring the current operational condition of the MHV within the tolerance band of the operational set point. The current operational condition may include a discharge speed, or a position of at least a portion of the MHV with respect to a reference, and the operational commands may modify the discharge speed or the position of the at least a portion of the MHV with respect to the reference.

In certain embodiments, the MHV of the system may be configured to move a material from a first location to a second location and to discharge the material at a discharge area located at the second location. In certain embodiments, the observed area may comprise the second location and the discharge area. The visual data from the vision system may comprise at least one of: a shape of a discharge pile, dimensional constraints of a discharge receptacle, proximity to the discharge area, a discharge rate, or a fill rate of the discharge receptacle.

In certain embodiments, the MHV may comprise a milling machine having a discharge conveyor, the discharge conveyor having a receiving end and a discharge end. The discharge area, in those embodiments, may comprise a bed of a dump truck. In other embodiments, the MHV may comprise a material transfer vehicle (MTV) having a discharge conveyor having a receiving end and a discharge end. In those embodiments, the discharge area may comprise a receiving hopper disposed on a paving machine. In certain other embodiments, the MHV may comprise a stacking conveyor having a receiving end and a discharge end, and the discharge area may comprise a gravel pile.

In certain embodiments, the system may further comprise a second MHV configured to move the material from a third location to a fourth location and to discharge the material at a discharge area located at the fourth location. The second MHV may comprise a second stacking conveyor. A second system for altering an operational condition of the second MHV, the system may comprise a second computer system, a second vision system, and a second controller. The second computer system may have a second processor configured to analyze visual data using a machine learning (ML) engine. The second vision system may comprise at least one camera configured to mount to the second MHV, to generate visual data by imaging a second observed area proximate the MHV, and to transmit the visual data to the second computer system for analysis. The second controller may be operatively connected to the second MHV and configured to receive an operational set point for the second MHV. The second controller may be further configured to execute operational commands generated by the second processor, where such commands modify an operational condition of the second MHV when executed by the second controller.

The second computer system is preferably configured to receive the visual data transmitted from the second vision system and analyst the visual data using the ML engine to determine if a current operational condition of the second MHV is within a tolerance band of the operational set point. If the current operational condition of the second MHV is outside of the tolerance band of the operational set point, the second computer system may generate operational commands for modifying the operational condition that are calculated to bring the current operational condition of the second MHV within the tolerance band of the operational set point. The discharge area at the fourth location may correspond to the receiving end of the first MHV.

Also disclosed herein is a method for altering an operational condition of a material-handling vehicle (MHV). The method may include the first step of providing the MHV at a first location. A next step may include providing a system for altering an operational condition of the MHV. The system may comprise a computer system, a vision system, and a controller. The computer system may have a processor configured to analyze visual data using a machine learning (ML) engine. The vision system may comprise at least one camera mounted to the MHV and be configured to generate visual data by imaging an observed area proximate the MHV and to transmit the visual data to the computer system for analysis. In certain embodiments, the vision system may be at least one of a standard camera, stereoscopic camera, infrared camera, LIDAR, or time of flight sensor. The controller may be configured to receive an operational set point for the MHV and to execute operational commands generated by the processor. The commands may modify the operational condition of the MHV when executed by the controller. The computer system may be further configured to receive the visual data transmitted from the vision system and to analyze the visual data using the ML engine to determine if a current operational condition of the MHV is within a tolerance band of the operational set point. If the current operational condition of the MHV is outside of the tolerance band of the operational set point, the computer system is configured to generate operational commands for modifying the operational condition. The operational commands may be calculated to bring the current operational condition of the MHV within the tolerance band of the operational set point.

As a next step in the method, a material may be placed on the MHV. Next, the operational set point is input into the controller. The next step includes moving the material, using the MHV, to a second location and then, using the vision system, imaging the observed area and generating visual data related to the observed area. Next, the visual data is transmitted to the computer system. The next step in the method includes analyzing said visual data with the ML engine of the computer system. A next step may include determining if the current operational condition of the MHV is outside of the tolerance band of the operational set point. If the current operational condition of the MHV is outside of the tolerance band of the operational set point, the next step includes generating operational commands for bringing the current operational condition within the tolerance band of the operational set point. The next step may include transmitting the operational commands to the controller. The final step of the method includes, using the controller, modifying the operational condition of the MHV.

In certain embodiments of the method, the MHV may be configured to move a material from a first location to a second location and to discharge the material at a discharge area located at the second location. The observed area may comprise the second location and the discharge area, and the visual data from the vision system may comprise a shape of a discharge pile, dimensional constraints of a discharge receptacle, or proximity to the discharge area. In certain embodiments, the current operational condition may include a discharge speed or a position of the MHV with respect to the discharge area and the operational commands may modify the discharge speed or position of the MHV with respect to the discharge area.

In certain embodiments of the method, the MHV comprises a material transfer vehicle (MTV) having a discharge conveyor having a receiving end and a discharge end. The discharge area may comprise a receiving hopper disposed on a paving machine. In certain other embodiments of the method, the MHV may comprise a milling machine having a discharge conveyor with a receiving end and a discharge end. The discharge area may the comprise a bed of a dump truck. In certain other embodiments, the MHV comprises a stacking conveyor having a receiving end and s discharge end. The discharge area in those embodiments may comprise a gravel pile.

In certain embodiments, the method may further comprise the steps of providing a second MHV configured to move the material from a third location to a fourth location. The second MHV may be further configured to discharge the material at a discharge area located at the fourth location. The second MHV in this embodiment may comprise a second stacking conveyor. The next step in the method may include providing a second system for altering an operational condition of the second MHV. The system may comprise a second computer system, a second vision system, and a second controller. The second computer system may have a second processor configured to analyze visual data using a machine learning (ML) engine. The second vision system may comprise at least one camera mounted to the second MHV and be configured to generate visual data by imaging an observed area proximate the second MHV and to transmit the visual data to the second computer system for analysis. The second controller may be configured to receive an operational set point for the second MHV and to execute operational commands generated by the second processor. The commands may modify the operational condition of the second MHV when executed by the controller. The second computer system may be further configured to receive the visual data transmitted from the vision system and to analyze the visual data using the ML engine to determine if a current operational condition of the second MHV is within a tolerance band of the operational set point. If the current operational condition of the second MHV is outside of the tolerance band of the operational set point, the second computer system is configured to generate operational commands for modifying the operational condition. The operational commands may be calculated to bring the current operational condition of the second MHV within the tolerance band of the operational set point.

In this embodiment, the discharge area at the fourth location corresponds to the receiving end of the first MHV. The next step in the method includes placing the material on the second MHV and then inputting the operational set point to the second controller. Then, using the second MHV, the material is moved to the fourth location. A next step includes, using the second vision system, imaging the discharge area and generating visual data related to the discharge area. A next step includes transmitting the visual data to the second computer system and analyzing said visual data with the ML engine of the second computer system. The next step includes determining if the current operational condition of the second MHV is outside of the tolerance band of the operational set point. If the current operational condition of the second MHV is outside of the tolerance band of the operational set point, a next step includes generating operational commands for bringing the current operational condition within the tolerance band of the operational set point. A next step in the method may be transmitting the operational commands to the second controller and, using the controller, modifying the operating condition of the second MHV.

Also disclosed herein is a system for positioning and operating a conveyor. The system may comprise a conveyor having a receiving end and a discharge end and being configured to convey an aggregate from the receiving end to the discharge end. A vision sensor may be mounted to a discharge end of the conveyor and be configured to sense a discharge area, generate data related to the discharge area, and transmit said data. The discharge area may be a hopper configured to receive aggregate. A processor may be configured to receive and analyze the data from the vision sensor and generate commands to modify an operational condition of the conveyor, preferably utilizing a neural network to analyze said data. A controller may be operatively connected to the conveyor and be configured to receive and execute the commands generated by the processor. The physical location of the discharge end may be changeable in three directions (X, Y, and Z).

BRIEF DESCRIPTION OF THE DRAWINGS

Further advantages of the invention are apparent by reference to the detailed description when considered in conjunction with the figures, which are not to scale so as to more clearly show the details, wherein like reference numerals represent like elements throughout the several views, and wherein.

DETAILED DESCRIPTION

Figure 1:
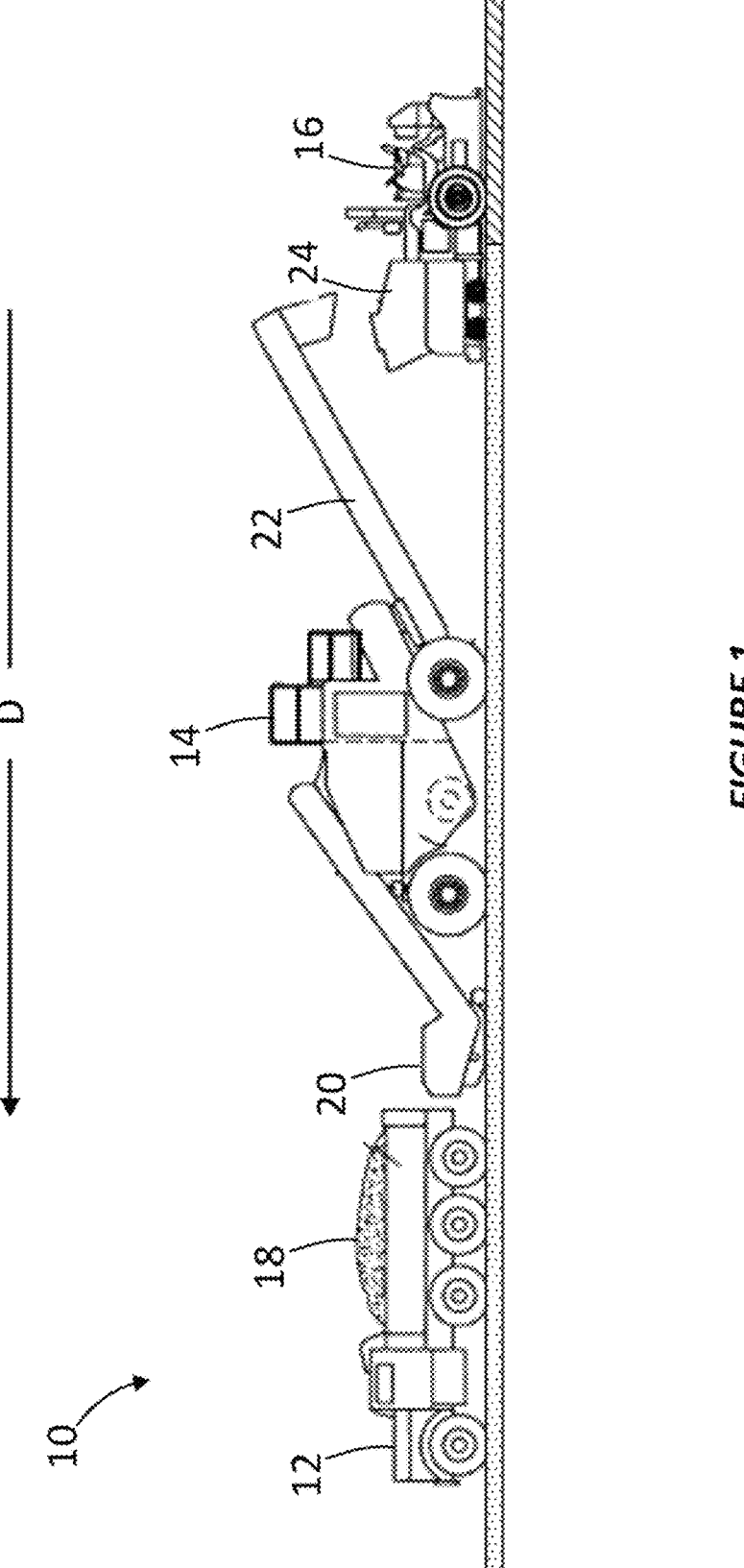
FIG. 1 is side elevation view of a conventional vehicle train used for carrying out a paving operation that includes a dump truck, a material transfer vehicle (MTV), and a paving machine.
Figure 2:
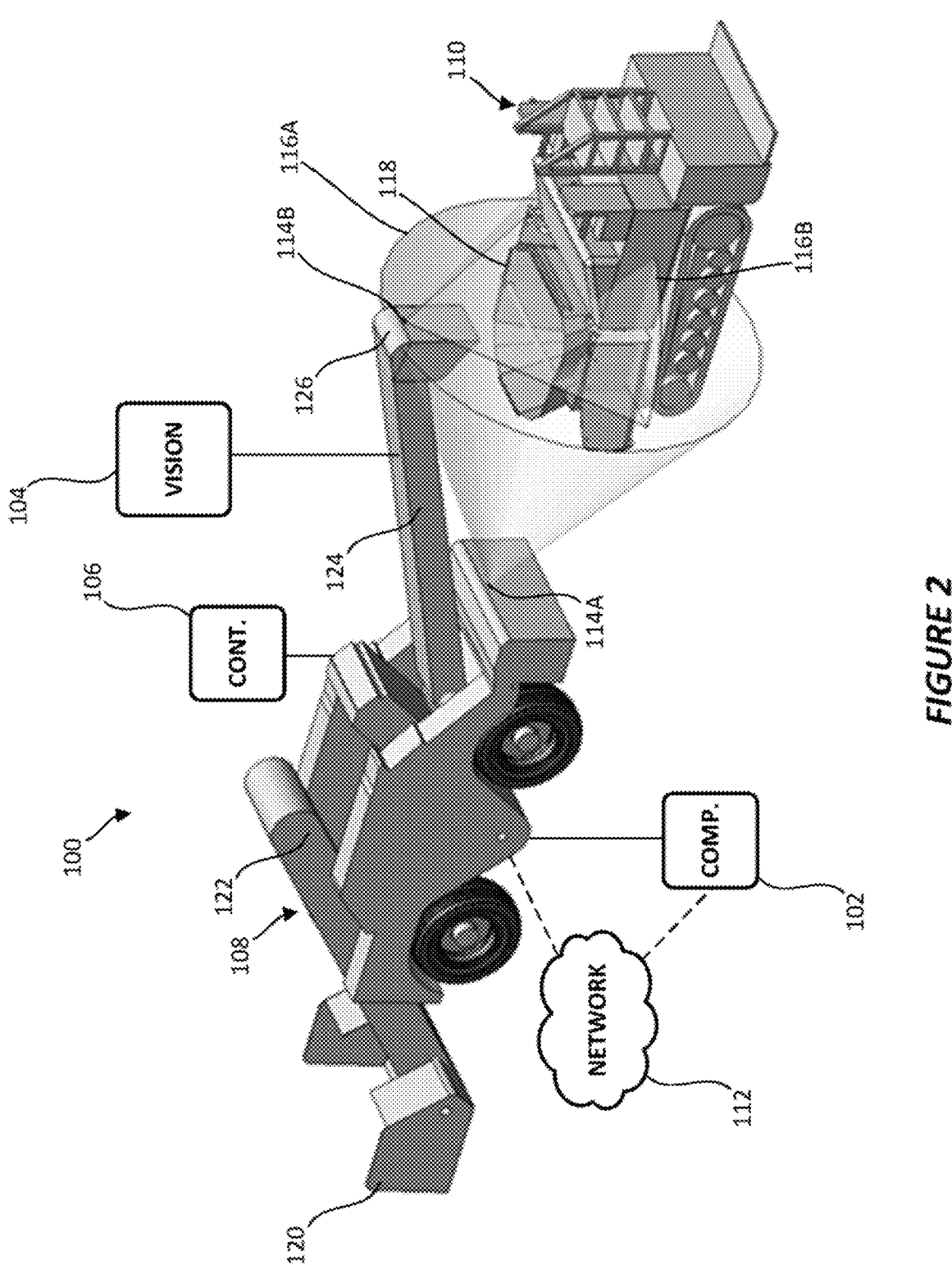
FIG. 2 is a perspective view of a system for altering an operational condition of a first material-handling vehicle (MHV) in concert with a paving machine according to an embodiment of the present invention.
Figure 3:
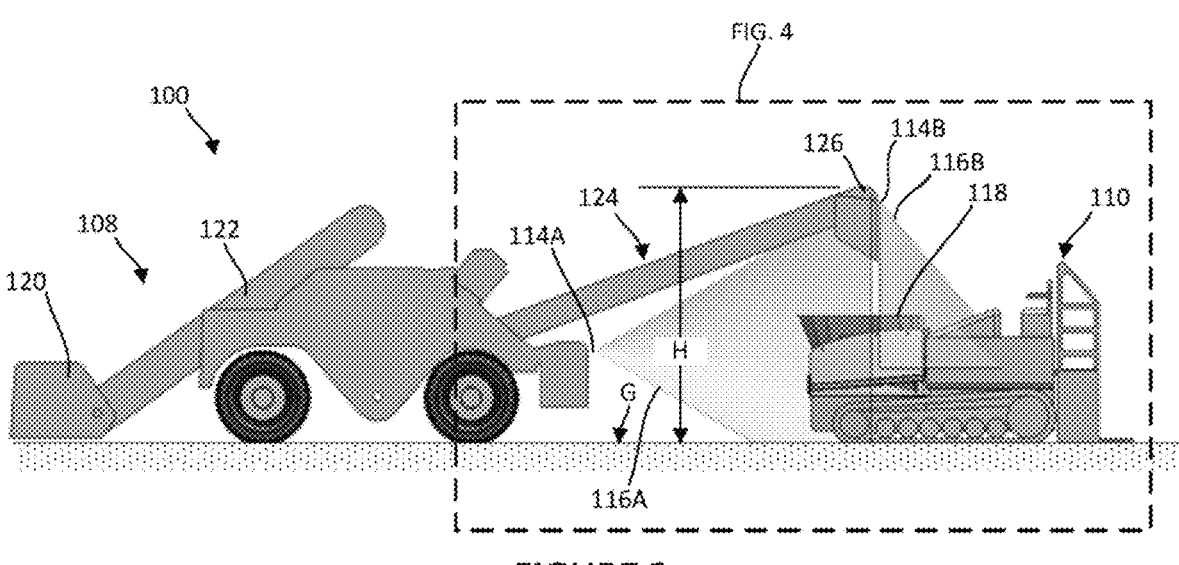
FIG. 3 is a side elevation view of the system shown in FIG. 2.
Figure 4:
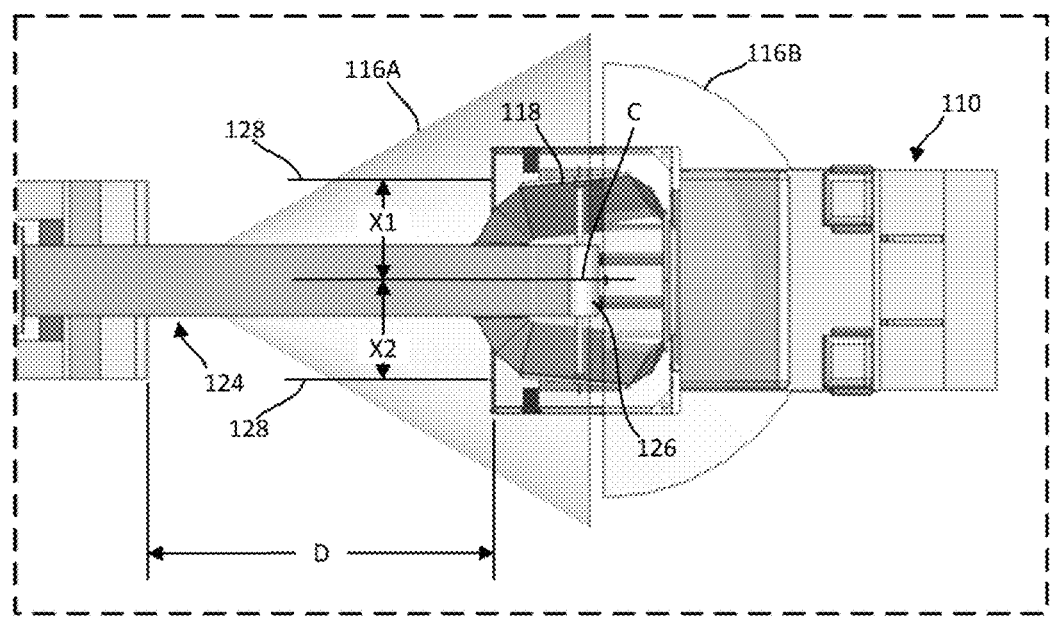
FIG. 4 is a top plan view of a portion of the system shown in FIG. 3 that is enclosed within a box labeled "FIG. 4"

Referring now to the drawings in which like reference characters designate like or corresponding characters throughout the several views, there is shown in FIGS. 2-4 a system 100 according to an embodiment of the present invention having a computer system 102, a vision system 104 and a controller 106 that are preferably directly or at least operatively connected to a material-handling vehicle (MHV) 108 and that each preferably communicate, either directly, indirectly, or remotely, with the computer system. The system 100 and MHV 108 operate in concert with an object of interest 110 that, in this illustrated embodiment, is a paving machine. However, as will be shown and described in more detail below, the object of interest 110 may take the form of other types of equipment (e.g., dump truck), objects (e.g., traffic cones or markers), or entities (e.g., people or animals). Advantageously, as described further below, this system 100 captures visual data using the visual system 104, analyzes the visual data using the computer system 102, and then, from or based on that analysis, provides control signals to the controller 106 that cause the controller to modify an operational condition of the MHV 108. Preferably, the controller 106 modifies the operational condition automatically and without requiring the input or attention of an operator.

Preferably, the computer system 102 is an onboard computer that is located on and communicates directly with the MHV 108 or is a remotely located computer that is not located on the MHV but that is capable of remotely communicating, via a communication network 112 (e.g., Internet or Bluetooth), with the other components of the system 100. The computer system 100 also preferably includes an image processor that employs a machine learning (ML) engine, such as an ML engine employing neural networks, to analyze the visual data. The visual data is generated by the vision system 104, which preferably is comprised of at least one camera 114. The camera 114 is preferably mounted to the MHV 108 and is positioned and oriented to image an observed area 116 that encompasses some or all of the object of interest 110 that is located nearby, adjacent to, proximate to, etc., the MHV 108. In the illustrated embodiment, vision system 104 includes a horizontal camera 114A observing a first observed area 116A and a vertical camera 114B observing a second observed area 116B. However, in other embodiments, the vision system 104 may employ greater or fewer cameras 114, and cameras may also be employed in any position and orientation on or in the MHV. In this case, both of the observed areas 116A, 116B encompass portions of paver hopper 118 of the object of interest 110 (here, a paving machine).

In this case, the MHV 108 is depicted as a material transport vehicle or "MTV," but the system 100 may be used in conjunction with a variety of MHVs, including without limitation, milling machines, paving machines, conveyors, etc. When MTV 108 is in use, aggregate is initially directed into input hopper 120 such as from a material source, along an input conveyor 122 that moves material away from the input hopper, onto a discharge conveyor 124 that receives material moved by the input conveyor and that includes a discharge end 126 for discharging the material at a selected discharge location. In use, the MHV is configured to transport material (e.g., aggregate) from a first location to a second location and, upon reaching the second location, to discharge the material at a selected discharge area. In this case, the paver hopper 118 is the selected discharge area where material discharged from discharge end 126 is deposited. Preferably, the discharge conveyor 124 can be articulated so as to position the discharge end 126 at a selected location in three-dimensional space (e.g., movable in X, Y, and Z directions in a Cartesian coordinate system) so that it is located at a selected position, orientation (including rotational position), distance, etc. relative to the paver hopper 118. Positioning the discharge end 126 near the paver hopper 118 helps in accurately depositing the material at the selected deposit location.

Each camera 114 is configured to image the appropriate observed area 116, which may include capturing still images and/or video taken at any appropriate wavelength or ranges of wavelengths of the electromagnetic spectrum (e.g., visible light, x-ray, microwave, etc.). As such, as used herein, the term "visual data" means any still image or video or related data (e.g., including metadata) that is captured at any wavelength or ranges of wavelengths of the electromagnetic spectrum. Once captured, the visual data is then transmitted to the computer system 102 for analysis and processing to determine what the visual data is showing and how to best respond or react. The visual data generated by each camera 114 may be sent to separate computer systems 102, however, the data may also be combined and sent to a single computer system 102, as shown in the illustrated embodiment.

The visual data captured by the camera 114 and the analysis conducted by the computer system 102 vary depending on the nature of the operational condition of the MHV 108 and the desired outcome. For example, in the illustrated embodiment, the system 100 might be configured to monitor the fill level of the paver hopper 118 and to ensure that the level of aggregate located in the paver hopper remains within a given range. In that case, therefore, cameras 114A and 114B might be configured to image the paver hopper 118 and the computer system 102 might be configured to identify the current fill level and/or to determine the rate at which the paver hopper 118 is being filled. However, in other cases, other outcomes might be desired. For example, in certain cases, it might be desirable for the MHV 108 to follow and to maintain a position and follow distance from a given point of interest. In such cases, cameras 114A, 114B located on the front of the MHV 108 might be used to image and to maintain the point of interest at a selected position. In other cases, temperature or vibration might be monitored using a thermal camera or a motion amplifying camera to maintain a given operational condition of the object of interest 110. Additional use cases are described below. In each case, the computer system 102 is preferably configured to issue operational commands based on or in response to the analysis of the visual data.

Next, the controller 106 is preferably operatively or directly connected to the MHV 108 and, in at least certain embodiments, is configured to receive operational set points and operational commands and to then execute those commands in order to modify an operational condition of the MHV 108. The operational set point may be specified by a user or may be specified by the computer 102 or by another source. Additionally, the operational set points may be specified manually or automatically in response to certain criteria being met. For example, one type of operational set point is distance, where the controller 106 is instructed to maintain a distance D between a selected portion on the MHV 108 and a selected portion of the object of interest 110. As another non-limiting example, the operational set point may be a height H of a portion (e.g., top) of discharge end 126 of the discharge conveyor 124 above a given point (e.g., ground surface G, top of paver hopper 118, etc.) or the extension/retraction position of the discharge end. In other cases, an operational set point may be the side-to-side position of a centerline C of the discharge conveyor 124 with respect to outermost edges 128 of the paver hopper 118. This position may be expressed as dimension X1 and X2, where the ideal position is when X1 and X2 are equal. Of course, different ideal positions are possible in other cases. Additionally, these and other similar measurements may be taken between any selected or convenient points of reference and the examples given above should not be considered as limiting examples.

In certain embodiments, upon receiving the visual data, the computer system 102 carries out an analysis to determine if a current condition of the MHV 108 is within a tolerance band of the operational set point. For example, concerning the position of the centerline C with respect to outermost edges 128 of the paver hopper 118, a tolerance band might be 30%. In that case, if X1 is greater or less than X2 by 30%, the computer system 102 would determine that the current condition is outside of the tolerance band. In other cases, absolute values may be used in place of percentages. In another example, concerning height H of a portion (e.g., top) of discharge end 126 of the discharge conveyor 124 above a given point (e.g., ground surface G), the set point might require that the height H be less than 15 feet. If the height H is more than 15 feet, the computer system 102 would determine that the current condition is outside of tolerance. In cases where the computer system 102 determines that the current operating condition is outside of tolerance, the computer system 102 is preferably configured to generate one or more operational commands for modifying the operational condition(s) of the MHV 108 that are calculated to bring the current operational condition within tolerance of the operational set point. In certain embodiments, the tolerance band may be pre-programmed into the computer system 102. However, in certain embodiments, the ML engine can analyze the visual data, determine what is being observed, determine what an ideal tolerance band might be, and generate operational commands to place the MHV 108 within the tolerance band. Such operational conditions may include, but are not limited to, a discharge speed of the discharge conveyor 124 or a position of the MHV 108 with respect to the discharge area.

In carrying out this determination, the computer system 102 analyzes visual data by employing a machine learning (ML) engine. Preferably, the ML engine is trained to identify or determine a feature or characteristic that is relevant to the operational set point and tolerance band. For example, if the set point relates to the height of a component or a distance between components, the ML engine would be trained to recognize and distinguish between items that are and are not that component. More specifically, the ML engine might be trained to recognize a top surface of a discharge end 126 and a ground surface G and to distinguish those structures from other structures that are within the observed area 116. In another instance, the ML engine may be used to identify and distinguish between authorized personnel and unauthorized personnel based on their clothing, height, whether they are human, and other distinguishing characteristics. For example, the ML engine might distinguish between an authorized operator and an unauthorized person based on their apparel. In that case, the ML is preferably trained to recognize characteristics of clothing associated with the authorized operator and to distinguish them from other apparel. In another case, the ML might be trained to identify and distinguish between an adult and a child or between a human and an animal based on their height or other defining characteristics.

In preferred embodiments, the ML engine is configured to gather the visual data used in making these determinations with a vision system 104 that employs standard video cameras and does not require visual data obtained from complex, expensive cameras. However, in other embodiments, other non-standard cameras are suitable and may include stereoscopic cameras, infrared cameras, LiDAR, or time-of-flight sensors.

Upon generating an operational command, the computer system 102 transmits the command to the controller 106. The controller 106, in turn, applies the command to the MHV 108, which modifies the operational condition. Again, the intention of modifying the operational condition of the MHV is bring that condition within the tolerance band. It is noted here that a tolerance "band" may be comprised of a single value or state of being and not a range of values or states of being (e.g., temperature at 100 degrees, speed at 35 miles per hour, state of being "on," state of being "human", etc.). Alternatively, the operational command may be transmitted to a separate machine or machine operator.

Also disclosed herein is a method for altering an operational condition of an MHV 108. The MHV 108 is configured to move a material from a first location to a second location and to discharge the material at a discharge area located at the second location. The method includes the step of first providing the MHV 108 at the first location as well as a system 100 for altering the operational condition of the MHV. The system 100 includes a computer system 102, a vision system 104, and a controller 106. The computer system 102 includes a processor configured to analyze visual data using an ML engine. The vision system 104 comprises at least one camera 114 mounted to the MHV 108. The vision system 104 is preferably configured to generate visual data by imaging the observed area 116. The vision system 104 is further configured to transmit the visual data to the computer system 102 for analysis. The controller 106 is preferably configured to receive an operational set point for the MHV 108 and to execute operational commands generated by the processor. The commands received modify the operational condition of the MHV 108 when executed by the controller 106. Examples of the operational condition include a position of at least a portion of the MHV 108 with respect to the observed area 116 or a discharge speed of the MHV. The computer system 102 is preferably configured to receive the visual data transmitted from the vision system 104. The computer system 102 is then configured to analyze the visual data using the ML engine to determine if a current operational condition of the MHV 108 is within a tolerance band of the operational set point. If the current operational condition is outside of the tolerance band, the computer system 102 is configured to generate operational commands for modifying the operational condition that are calculated to bring the current operational condition of the MHV 108 within the tolerance band of the set point.

In certain embodiments, when the above-described system is in use, material is placed on the MHV 108, and the MHV is used to move that material from the first location to the second location. The controller 106 is provided with an operational set point. The vision system 104 is used to image the observed area 116 and to gather visual data that is then provided to the computer system 102. The computer system 102 analyzes the visual data utilizing the ML engine to determine whether the current operational state of the MHV 108 is within a tolerance band of the operational set point. If the current operational condition of the MHV 108 is outside of the tolerance band, the computer system 102 generates operational commands for bringing the current operational condition within the tolerance band of the operational set point. The operational commands are transmitted to and are then executed by the controller 106 to modify the operational condition of the MHV 108.

Figure 5:
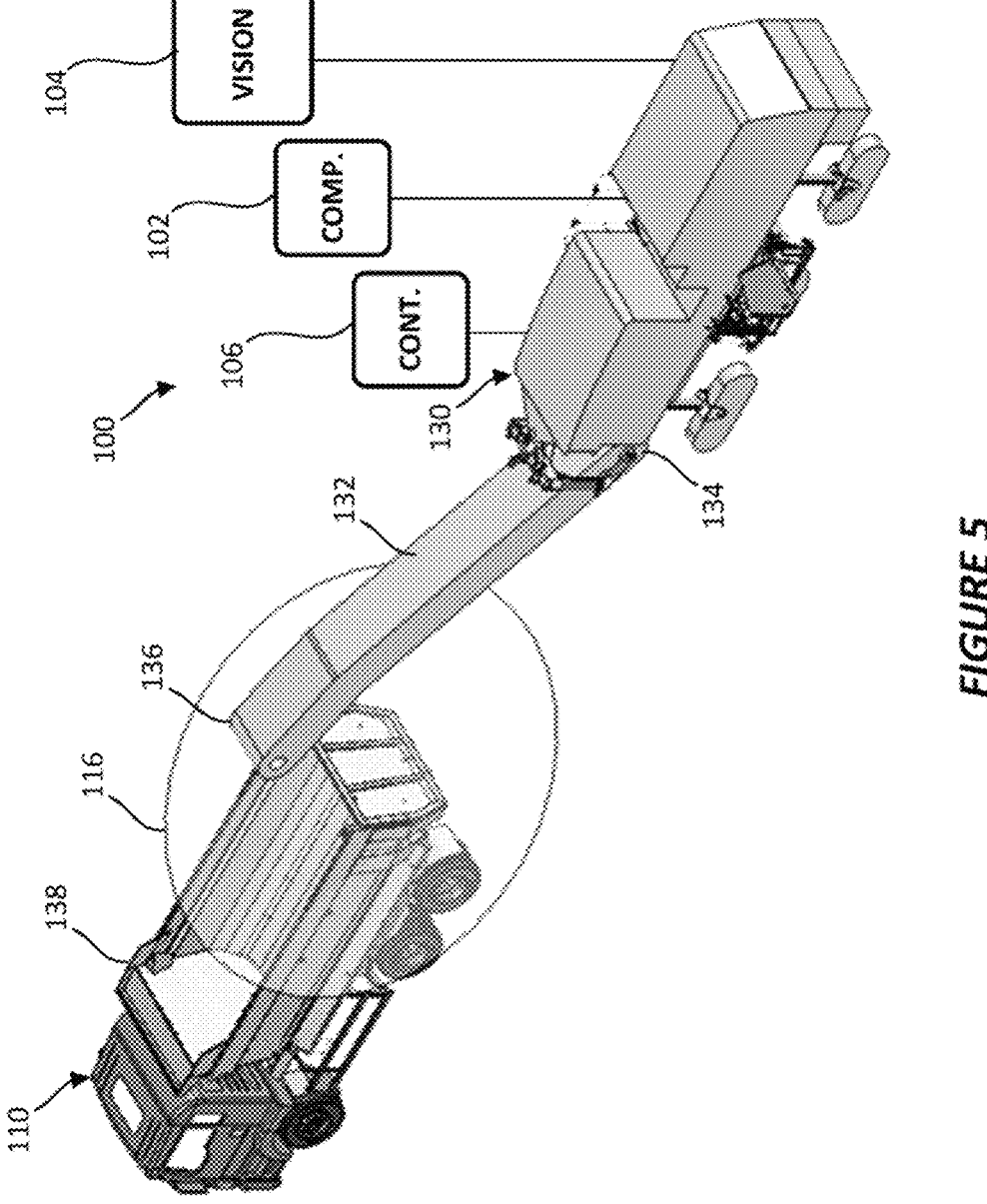
FIG. 5 is a perspective view of a system for altering an operational condition of a second MHV in concert with a dump truck according to an alternative embodiment of the present invention.
Figure 6:
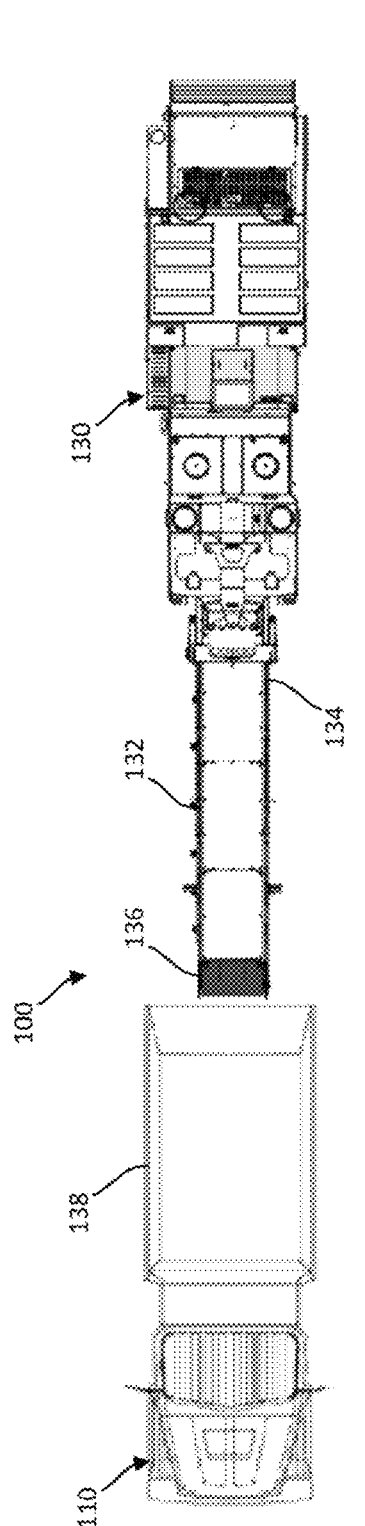
FIG. 6 is a top plan view of the system shown in FIG. 5.
Figure 7:
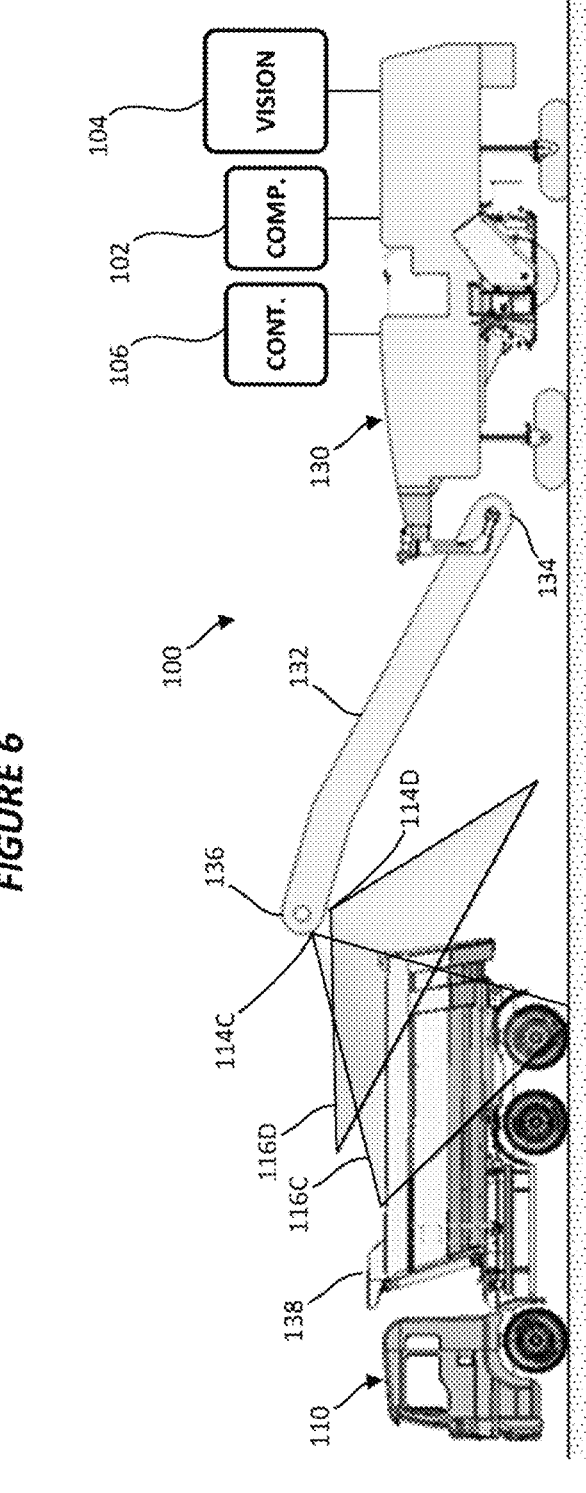
FIG. 7 is a side elevation view of the system shown in FIG. 5.

Turning now to FIGS. 5-7, the system 100 is disposed on a different MHV 130 (i.e., a milling machine) that is equipped with a discharge conveyor 132 having a receiving end 134 and a discharge end 136. Two cameras 114C, 114D are mounted to the discharge end 136 of the discharge conveyor 132 and are positioned and oriented to image portions of observed areas 116C, 116D. In this embodiment, the observed area 116 may encompass some, all, or separate portions of an object of interest 110 (i.e., a bed 138 of a dump truck). As the milling machine 130 moves material, via discharge conveyor 132, to the bed 138, the cameras 114 image the observed area 116 and, from that imaging, generate visual data that can be used by the computer system 102 to determine a current operational state of the milling machine (e.g., fill level of the bed). As part of making this determination, the computer system 102 might analyze the visual data using the ML engine to identify the bed 138, to determine the current bed fill level, to compare the current bed fill level to an ideal or pre-determined fill level (i.e., the operational set point), and to determine if that current fill level is within a tolerance band of that operational set point. In other cases, the computer system 102 may be used to determine a follow distance between the milling machine 130 and the dump truck 110 to ensure that the discharge end 136 is correctly located over the bed 138 of the dump truck 110. Of course, as described above, other types of analyses may be conducted using the visual data based on the operational set points.

In each case, based on the determinations carried out and the operational set points, the computer system 102 may generate commands that are calculated to bring the current operational condition within tolerance of the operational set point. These commands might, for example, bring the current bed fill level to within the tolerance band of the desired fill level, move the discharge end 136 into a correct position, etc. Specifically, these commands might cause the rotational speed or the orientation of the discharge conveyor 132 to be modified. In other cases, the speed or travel direction of the milling machine 130 may be altered.

Preferably, the computer system 102 generates the appropriate commands that are calculated to make these changes to the operational state and then those commands are provided to and are automatically enacted by the controller 106 without requiring input or attention of an operator of the MHV 130 (or anyone else). Upon reaching the operational set point (e.g., ideal fill state), the computer system 102 preferably generates another command to maintain the operational state of the MHV 130 (e.g., to stop the discharge conveyor 132). In other some cases, once the operational set point has been achieved, the computer system 102 might generate an alert. For example, once the bed 138 of the dump truck has reached capacity, an alert calling for a replacement dump truck might be generated. These alerts may be transmitted, for example, to the operator of the dump truck, a different dump truck, or to other onsite personnel or both. The filled dump truck can then be moved and replaced with an empty truck.

Figure 8:
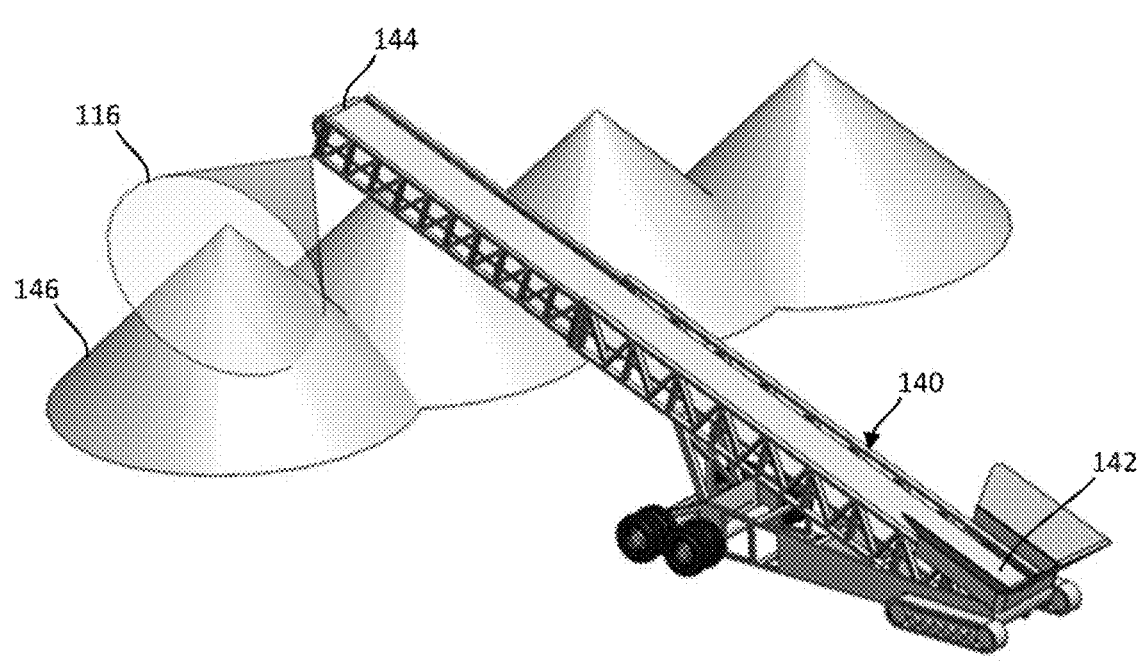
FIG. 8 is a perspective view of a system for altering an operational condition of a third MHV according to an alternative embodiment of the present invention.
Figure 9:
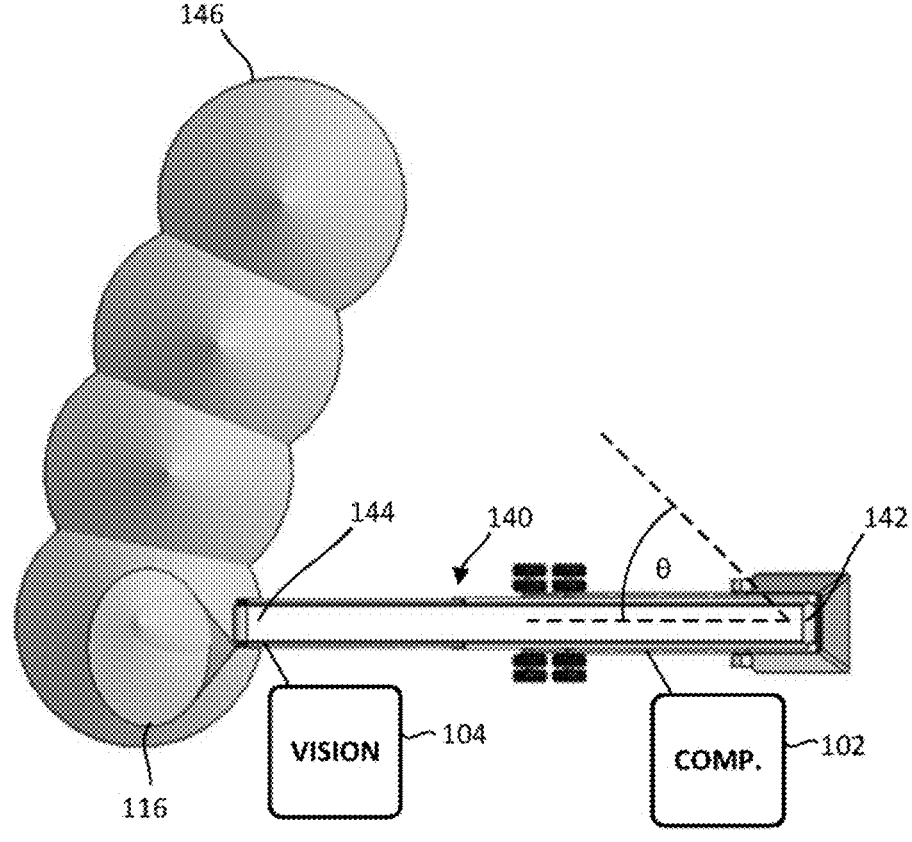
FIG. 9 is a top plan view of the system of FIG. 8.

Now with reference to FIGS. 8 and 9, in certain embodiments, a third MHV 140 is a stacking conveyor. The stacking conveyor 140 has a receiving end 142 and a discharge end 144. In certain embodiments, a vision system 104 having at least one camera (not shown) is mounted to MHV 140 in a position and orientation that is convenient for observing an object of interest that is located proximate the MHV, such as at the discharge end 144. In this embodiment, the observed area 116 may encompass some, all, or separate portions of one or more piles 146 of aggregate, such as gravel. As the discharge creates a pile 146, visual data captured by the vision system 104 is provided to and analyzed by the computer system 102. This data may be used, for example, to determine, monitor, or verify the placement, size, etc. of the pile 146 of aggregate. For example, in certain embodiments, the computer system 102 utilizes the visual data to create a 3D model of the current pile 146 and/or the desired pile size and shape or both. The computer system 102 may be configured to then determine and compare the volumes of the current and desired pile 146. Based on this analysis, the computer system 102 can determine if and by how much the current pile 146 differs from the desired pile (i.e., whether the current condition is within a tolerance band of an operational set point).

Then, when necessary, utilizing the visual data gathered by the vision system 104 and the computer system's analysis of that data, commands may be generated by the computer system 102 to modify an operational condition of the MHV 140. For example, once a first pile 146 has the desired size and shape, one such command might cause the discharge end 144 to be repositioned to create a new pile, such as by rotating the conveyor 140 along arc θ or by moving the conveyor as a whole.

Figures 10, 11:
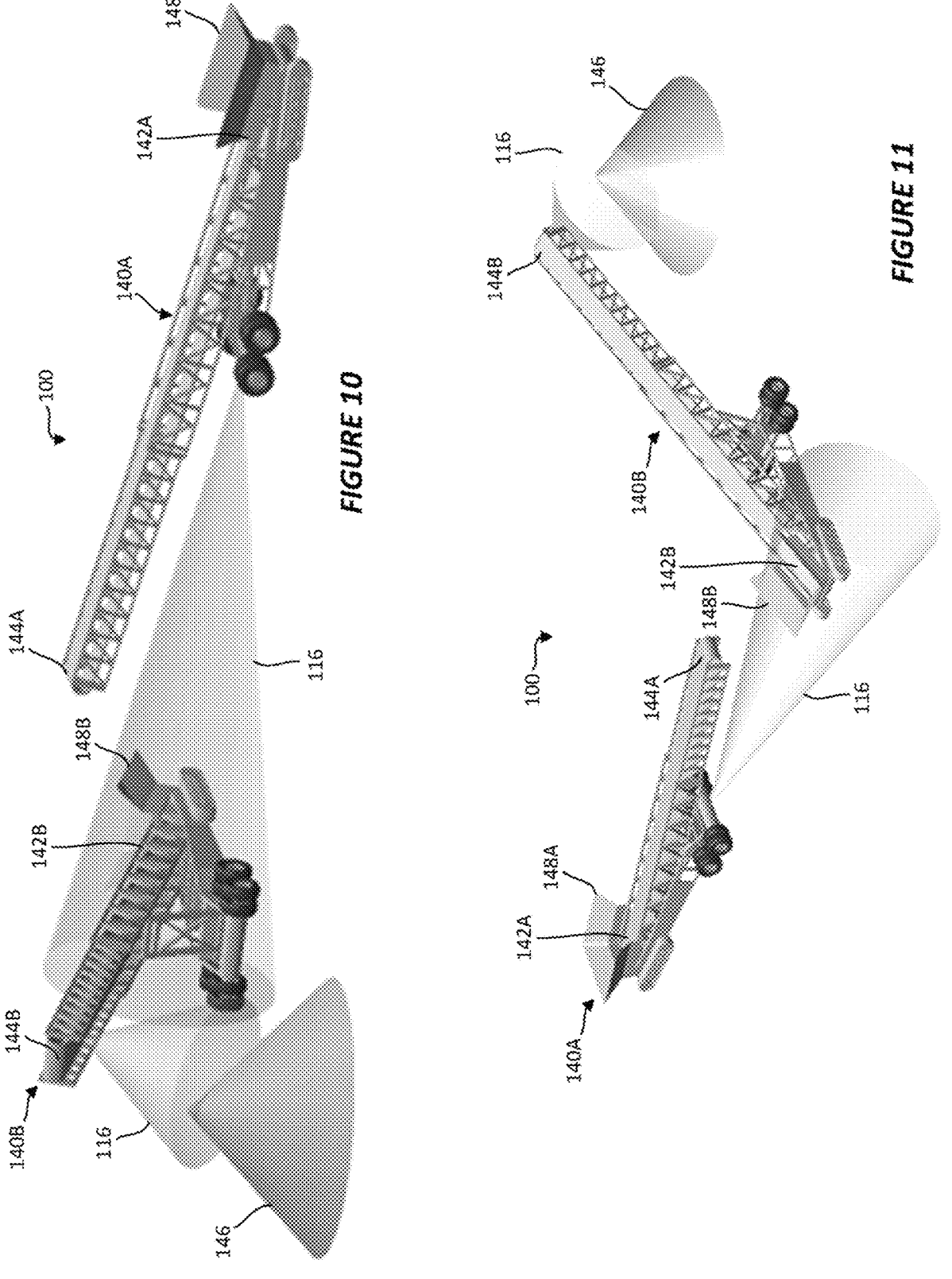
FIG. 10 is a perspective view of a system for altering an operational condition of a pair of fourth MHVs according to an alternative embodiment of the present invention.
FIG. 11 is an alternative perspective view of the system shown in FIG. 10.

In certain embodiments, such as those shown in FIGS. 10 and 11, the system 100 comprises two or more MHVs (e.g., two stacking conveyors 140). In the illustrated embodiment, a first stacking conveyor 140A and a second stacking conveyor 140B are shown. The stacking conveyors 140 are configured to move a material from one location to the next. For example, first stacking conveyor 140A might move material from a first location (e.g., an aggregate stockpile) to a second location (e.g., a next conveyor in a sequence of conveyors such as second stacking conveyor 140B) before being further conveyed to other locations (e.g., additional conveyors in the sequence or a final location). For example, in one implementation, material sourced from an aggregate stockpile is first deposited into first hopper 148A and is then conveyed to receiving end 142A of the first stacking conveyor 140A, where the material is then conveyed to discharge end 144A and discharged. A camera (not shown) is preferably mounted to stacking conveyor 140A and is positioned and oriented to image portions of observed area 116. In this embodiment, the observed area 116 for each camera may encompass some or all of an object of interest (e.g., second stacking conveyor 140B or other conveyors in a sequence of conveyors). The camera may be used to correctly locate the first stacking conveyor 140A such that the discharge end 144A is suitably positioned with respect to the second conveyor 140B such that material discharged from discharge end 144A falls directly into second hopper 148B. From there, the material is conveyed to receiving end 142B of the second stacking conveyor 140B and then conveyed to discharge end 144B and discharged to a third location (e.g., pile 146 or a further stacking conveyor in a sequence of conveyors).

In carrying out the above-described process, a single computer system or multiple computer systems may be used to control the MHVs. In particular, in certain embodiments, a separate system 100, including separate vision systems and controllers, may be provided for each of the MHVs 140 in order to allow them each to operate independently or in conjunction with one another. Preferably, when separate systems are used, the visual data, control signals, etc., are shared or at least coordinated so as to coordinate the movement of the system as a whole (e.g., the entire sequence of stacking conveyors is coordinated) or portions of the system. Of course, a single system 100 may also be used to coordinate the entire system as well.

Figure 12:
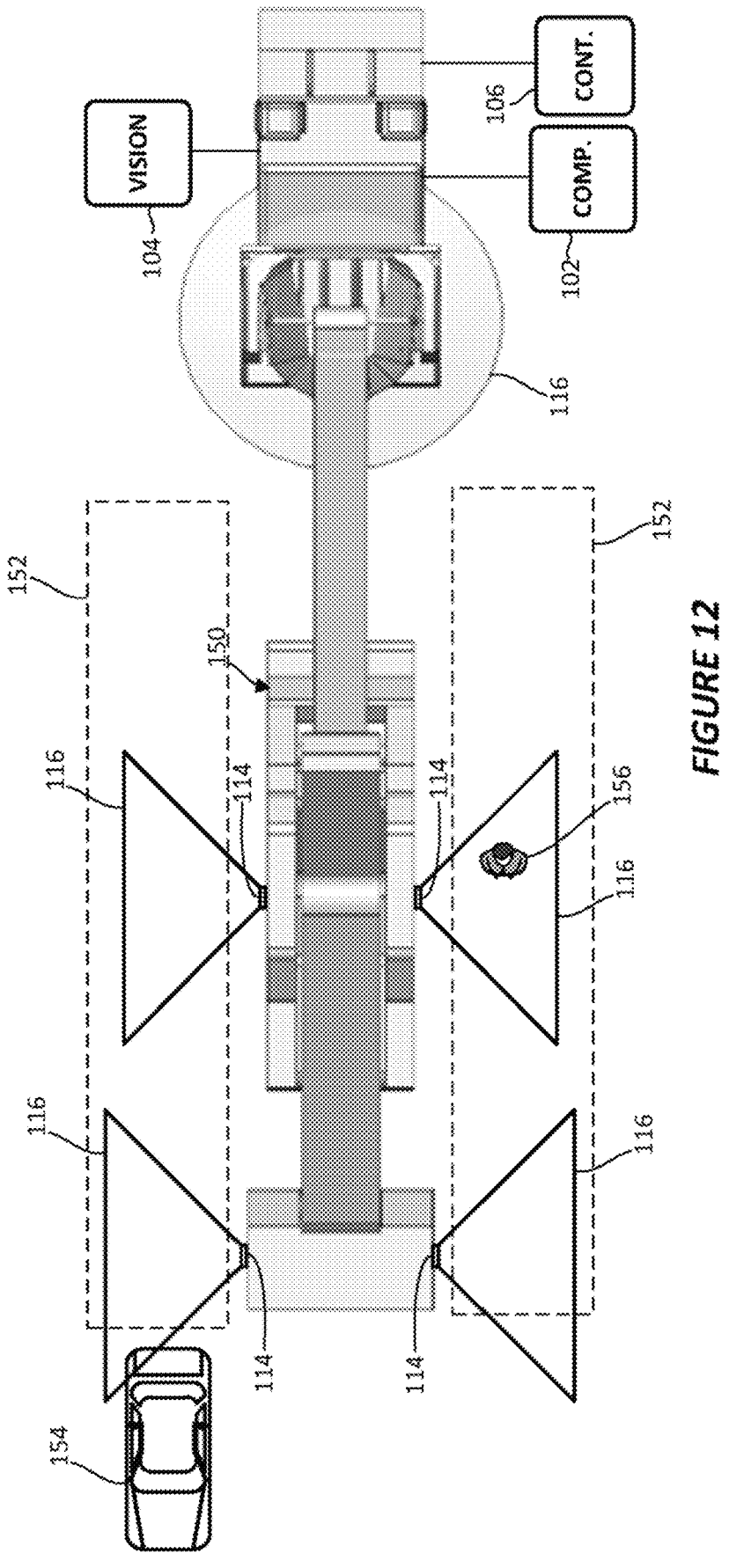
FIG. 12 is a top plan view of one of the pair of fourth MHVs shown in FIG. 10.

Turning now to FIG. 12, in certain embodiments, it may be beneficial to utilize computer system 102 and arrange the vision system 104 (or multiple vision systems) to image observed areas 116 located proximate MHV 150. For instance, mounting cameras 114 to the sides of the MHV 150 allows the cameras to image and generate visual data for the immediate areas 152 surrounding the MHV. As with the other embodiments, this visual data is then sent to the computer system 102 for analysis. However, instead of analyzing a discharge area for aggregate or other materials, the computer system 102, still utilizing the ML engine, determines if the immediate area 152 represents an acceptable immediate area or not. This could include, for example, determining whether objects 154 (e.g., vehicle) or entities 156 (e.g., animals or people) are present in the immediate areas 152. Preferably, the computer system 102 is able to determine, using the ML engine, what those objects 154 or entities 156 are, their current status, and whether they should or should not be located in the immediate areas 152. Preferably, the ML engine is capable of making this determination without the use of facial recognition and without the use of other personally-identifiable information. Similarly, the ML engine is also capable of making this determination without the benefit of beacons, transponders or other identifying means that have been provided, mounted to, or associated with the objects or entities being identified.

For instance, if the visual data depicts an unauthorized individual, e.g., someone who does not match the physical characteristics of those authorized or someone not wearing the appropriate PPE or uniform, the computer system 102 might generate and then cause a command to be sent to the controller 106 to adjust an operational condition of the MHV 150. For example, in certain cases, if a child is observed, as determined by their small stature, or an improperly parked vehicle is observed in the immediate area 152, the computer system 102 may generate an operational command to immediately stop or slow the MHV 150. Additionally, or alternatively, the computer system 102 might flag the anomaly by causing an alert to be issued, as discussed above. In certain cases, an alert may be issued without causing the operational condition of the MHV 108 to be altered. At the same time, the presence of an object or an entity might be permitted or even required to maintain the operation of the MHV 150. For example, if an operator or observer is required to be present in a specific location (e.g., in immediate area 152) with respect to a MHV 150, cameras 114 might be used to observe that area and then ensure that the condition (i.e., person located in immediate area) is met. Otherwise, the controller might issue a command to slow or stop the MHV 150 (or take other appropriate action, e.g., issue an alert).

The systems and methods have been described, primarily, using examples featuring conveyors or machines having conveyors used in the road building industry. Also, the cameras used in the vision systems have been placed, primarily, on the "sending" machine (i.e., the machine carrying and discharging the material at a discharge location). The cameras have also been shown as imaging only exterior elements. However, this inventive concept may be applied to any form of machinery, including both mobile and stationary machinery, as well as to any industry. Finally, the camera systems may be used on any portion of those systems, including either or both the "sending" machine as well as the "receiving" machine that receives the material being transported, and also in any location of those systems including both exterior and interior portions thereof. For example, cameras may be located within an operator's booth of a machine receiving aggregate material (e.g., a material transfer vehicle receiving aggregate from a dump truck).

Although this description contains many specifics, these should not be construed as limiting the scope of the invention but as merely providing illustrations of some of the presently preferred embodiments thereof, as well as the best mode contemplated by the inventor of carrying out the invention. The invention, as described herein, is susceptible to various modifications and adaptations as would be appreciated by those having ordinary skill in the art to which the invention relates.

What is claimed is:

1. A system for altering an operational condition of a material-handling vehicle (MHV) comprising:
   a computer system having a processor configured to analyze visual data using a machine learning (ML) engine;
   a vision system comprising at least one camera that is configured to mount to the MHV, to generate visual data by imaging an observed area proximate the MHV, and to transmit the visual data to the computer system for analysis; and
   a controller operatively connected to the MHV and configured to receive an operational set point for the MHV and to execute operational commands generated by the processor, where such commands modify an operational condition of the MHV when executed by the controller,
   wherein the computer system is configured to:
       receive the visual data transmitted from the vision system;
       analyze the visual data using the ML engine to determine if a current operational condition of the MHV is within a tolerance band of the operational set point; and
       when the current operational condition of the MHV is outside of the tolerance band of the operational set point, to generate operational commands for modifying the operational condition that are calculated to bring the current operational condition of the MHV within the tolerance band of the operational set point.

2. The system of claim 1 wherein the vision system comprises at least one of a standard camera, stereoscopic camera, infrared camera, LiDAR, or time of flight sensor.

3. The system of claim 1 wherein the MHV is configured to move a material from a first location to a second location and to discharge the material at a discharge area located at the second location.

4. The system of claim 3 wherein the observed area comprises the second location and the discharge area, and
   wherein the visual data from the vision system comprises a at least one of: a shape of a discharge pile, dimensional constraints of a discharge receptacle, proximity to the discharge area, a discharge rate, or a fill rate of the discharge receptacle.

5. The system of claim 3 wherein the current operational condition includes a discharge speed, or a position of at least a portion of the MHV with respect to a reference, and wherein the operational commands modify the discharge speed or the position of the at least portion of the MHV with respect to the reference.

6. The system of claim 3 wherein the MHV comprises a milling machine having a discharge conveyor having a receiving end and a discharge end, and
   wherein the discharge area comprises a bed of a dump truck.

7. The system of claim 3 wherein the MHV comprises a material transfer vehicle (MTV) having a discharge conveyor having a receiving end and a discharge end.

8. The system of claim 7 wherein the discharge area comprises a receiving hopper disposed on a paving machine.

9. The system of claim 3 wherein the MHV comprises a stacking conveyor having a receiving end and a discharge end, and
   wherein the discharge area comprises a gravel pile.

10. The system of claim 9 further comprising a second MHV configured to move the material from a third location to a fourth location and to discharge the material at a discharge area located at the fourth location, the second MHV comprising a second stacking conveyor; and
   a second system for altering an operational condition of the second MHV, the system comprising:
       a second computer system having a second processor configured to analyze visual data using a machine learning (ML) engine;
       a second vision system comprising at least one camera that is configured to mount to the second MHV, to generate visual data by imaging a second observed area proximate the MHV, and to transmit the visual data to the second computer system for analysis; and
       a second controller operatively connected to the second MHV and configured to receive an operational set point for the second MHV and to execute operational commands generated by the second processor, where such commands modify an operational condition of the second MHV when executed by the second controller,
       wherein the second computer system is configured to:
           receive the visual data transmitted from the second vision system;
           analyze the visual data using the ML engine to determine if a current operational condition of the second MHV is within a tolerance band of the operational set point;
           where the current operational condition of the second MHV is outside of the tolerance band of the operational set point, to generate operational commands for modifying the operational condition that are calculated to bring the current operational condition of the second MHV within the tolerance band of the operational set point, and
       wherein the discharge area at the fourth location corresponds to the receiving end of the first MHV.

11. A method for altering an operational condition of a material-handling vehicle (MHV) including the steps of:
   providing the MHV at a first location;
   providing a system for altering an operational condition of the MHV, the system comprising:
       a computer system having a processor configured to analyze visual data using a machine learning (ML) engine;
       a vision system comprising at least one camera mounted to the MHV and configured to generate visual data by imaging an observed area proximate the MHV and to transmit the visual data to the computer system for analysis; and
       a controller configured to receive an operational set point for the MHV and to execute operational commands generated by the processor, where such commands modify the operational condition of the MHV when executed by the controller, wherein the computer system is configured to:

receive the visual data transmitted from the vision system;

analyze the visual data using the ML engine to determine if a current operational condition of the MHV is within a tolerance band of the operational set point;

where the current operational condition of the MHV is outside of the tolerance band of the operational set point, to generate operational commands for modifying the operational condition that are calculated to bring the current operational condition of the MHV within the tolerance band of the operational set point, placing a material on the MHV;

inputting the operational set point to the controller;

moving the material, using the MHV, to a second location;

using the vision system, imaging the observed area and generating visual data related to the observed area;

transmitting the visual data to the computer system;

analyzing said visual data with ML engine of the computer system;

determining if the current operational condition of the MHV is outside of the tolerance band of the operational set point;

if the current operational condition of the MHV is outside of the tolerance band of the operational set point, generating operational commands for bringing the current operational condition within the tolerance band of the operational set point;

transmitting the operational commands to the controller;

using the controller, modifying the operational condition of the MHV.

12. The method of claim 11 wherein the MHV is configured to move a material from a first location to a second location and to discharge the material at a discharge area located at the second location.

13. The method of claim 12 wherein the observed area comprises the second location and the discharge area, and wherein the visual data from the vision system comprises a shape of a discharge pile, dimensional constraints of a discharge receptacle, or proximity to the discharge area.

14. The method of claim 12 wherein the current operational condition includes a discharge speed, or a position of the MHV with respect to the discharge area, and wherein the operational commands modify the discharge speed or the position of the MHV with respect to the discharge area.

15. The method of claim 12 wherein the vision system is at least one of a standard camera, stereoscopic camera, infrared camera, LiDAR, or time of flight sensor.

16. The method of claim 12 wherein the MHV comprises a material transfer vehicle (MTV) having a discharge conveyor having a receiving end and a discharge end, and wherein the discharge area comprises a receiving hopper disposed on a paving machine.

17. The method of claim 12 wherein the MHV comprises a milling machine having a discharge conveyor having a receiving end and a discharge end, and wherein the discharge area comprises a bed of a dump truck.

18. The method of claim 12 wherein the MHV comprises a stacking conveyor having a receiving end and a discharge end, and wherein the discharge area comprises a gravel pile.

19. The method of claim 18 further comprising the steps of:

providing a second MHV configured to move the material from a third location to a fourth location and to discharge the material at a discharge area located at the fourth location, the second MHV comprising a second stacking conveyor; and providing a second system for altering an operational condition of the second MHV, the system comprising:

a second computer system having a second processor configured to analyze visual data using a machine learning (ML) engine;

a second vision system comprising at least one camera that is configured to mount to the second MHV, to generate visual data by imaging a second observed area proximate the MHV, and to transmit the visual data to the second computer system for analysis; and a second controller operatively connected to the second MHV and configured to receive an operational set point for the second MHV and to execute operational commands generated by the second processor, where such commands modify an operational condition of the second MHV when executed by the second controller, wherein the second computer system is configured to:

receive the visual data transmitted from the second vision system;

analyze the visual data using the ML engine to determine if a current operational condition of the second MHV is within a tolerance band of the operational set point;

where the current operational condition of the second MHV is outside of the tolerance band of the operational set point, to generate operational commands for modifying the operational condition that are calculated to bring the current operational condition of the second MHV within the tolerance band of the operational set point, and wherein the discharge area at the fourth location corresponds to the receiving end of the first MHV, placing the material on the second MHV;

inputting the operational set point to the second controller;

moving the material, using the second MHV, to the fourth location;

using the second vision system, imaging the discharge area and generating visual data related to the discharge area;

transmitting the visual data to the second computer system;

analyzing said visual data with ML engine of the second computer system;

determining if the current operational condition of the second MHV is outside of the tolerance band of the operational set point;

if the current operational condition of the second MHV is outside of the tolerance band of the operational set point, generating operational commands for bringing the current operational condition within the tolerance band of the operational set point;

transmitting the operational commands to the second controller; and using the controller, modifying the operational condition of the second MHV.

20. A system for positioning and operating a conveyor, the system comprising:

the conveyor having a receiving end and a discharge end and being configured to convey an aggregate from the receiving end to the discharge end;

a vision sensor configured to sense a discharge area, generate data related to the discharge area, and transmit said data;

a processor configured to receive and analyze the data from the vision sensor and generate commands to modify an operational condition of the conveyor; and a controller operatively connected to the conveyor for receiving and executing the commands generated by the processor, wherein, based on the commands, the controller adjusts a physical location of the discharge end and a discharge speed of the conveyor;

wherein the vision sensor is at least one of a standard camera, a stereoscopic camera, an infrared camera, or a time-of-flight sensors;

wherein the vision system is mounted to the discharge end of the conveyor;

wherein the processor utilizes a neural network to analyze said data;

wherein the discharge area is a hopper configured to receive aggregate; and wherein the physical location of the discharge end is changeable in three directions.

\* \* \* \* \*